Sept. 29, 1936.　　　G. F. YAGER　　　2,055,887
CLUTCH AND BRAKE MECHANISM
Original Filed Dec. 15, 1930　　4 Sheets-Sheet 1
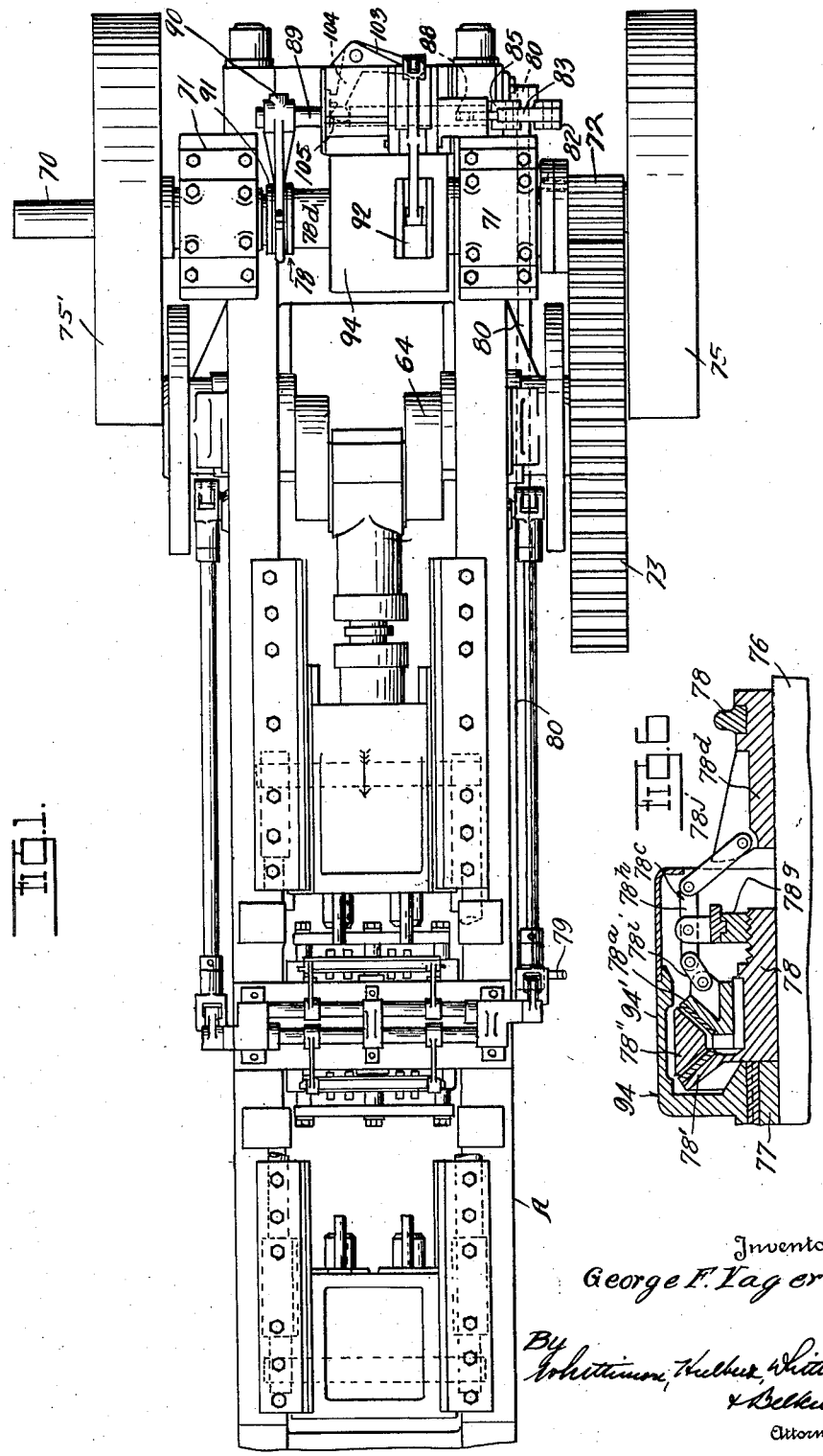
Inventor
George F. Yager
By
Attorneys Sept. 29, 1936.　　　G. F. YAGER　　　2,055,887
CLUTCH AND BRAKE MECHANISM
Original Filed Dec. 15, 1930　　4 Sheets-Sheet 2
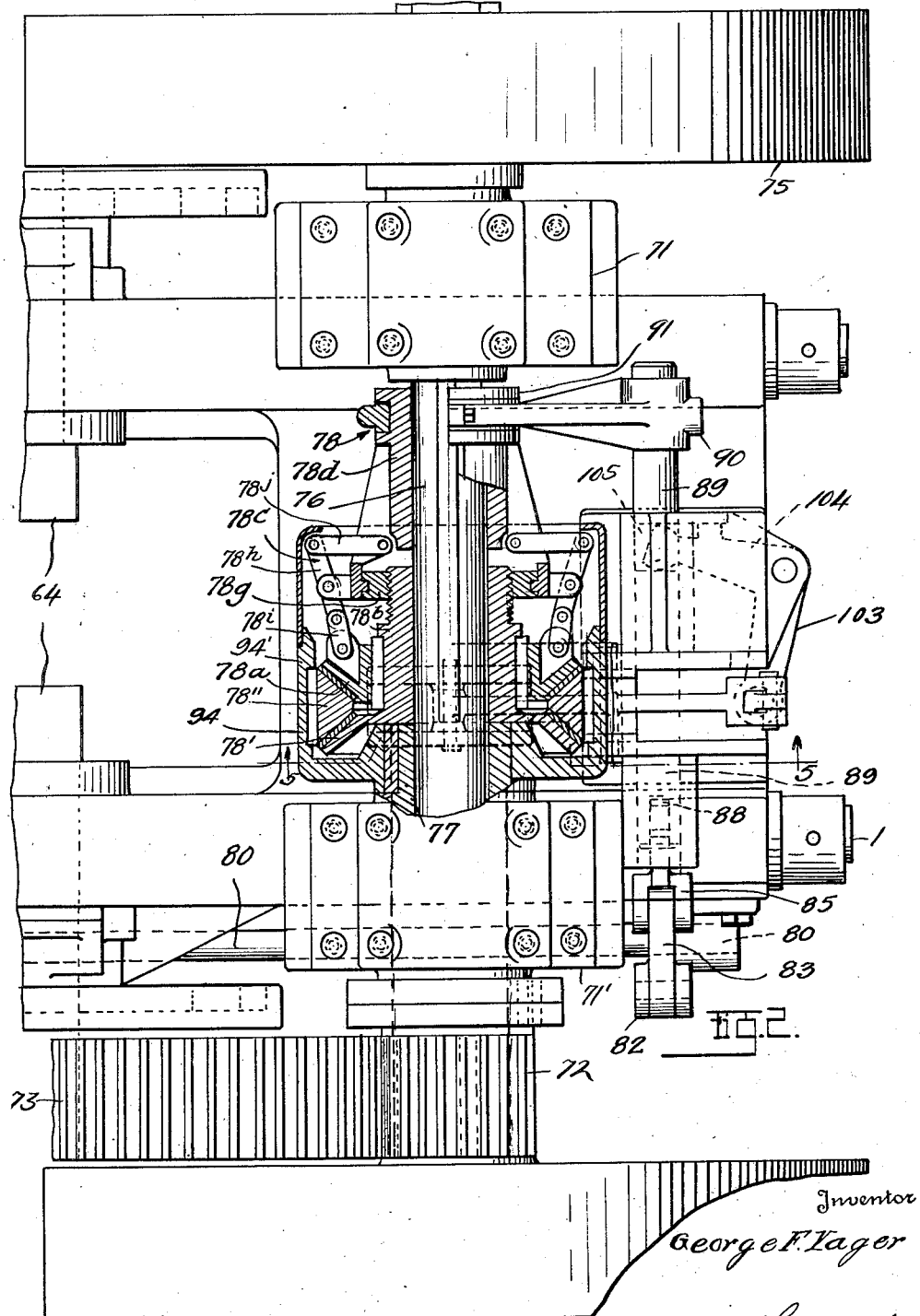
Inventor
George F. Yager
By Wittemann, Hulbert, Wittemann & Bulkley
Attorneys Sept. 29, 1936. G. F. YAGER 2,055,887
CLUTCH AND BRAKE MECHANISM
Original Filed Dec. 15, 1930 4 Sheets-Sheet 3
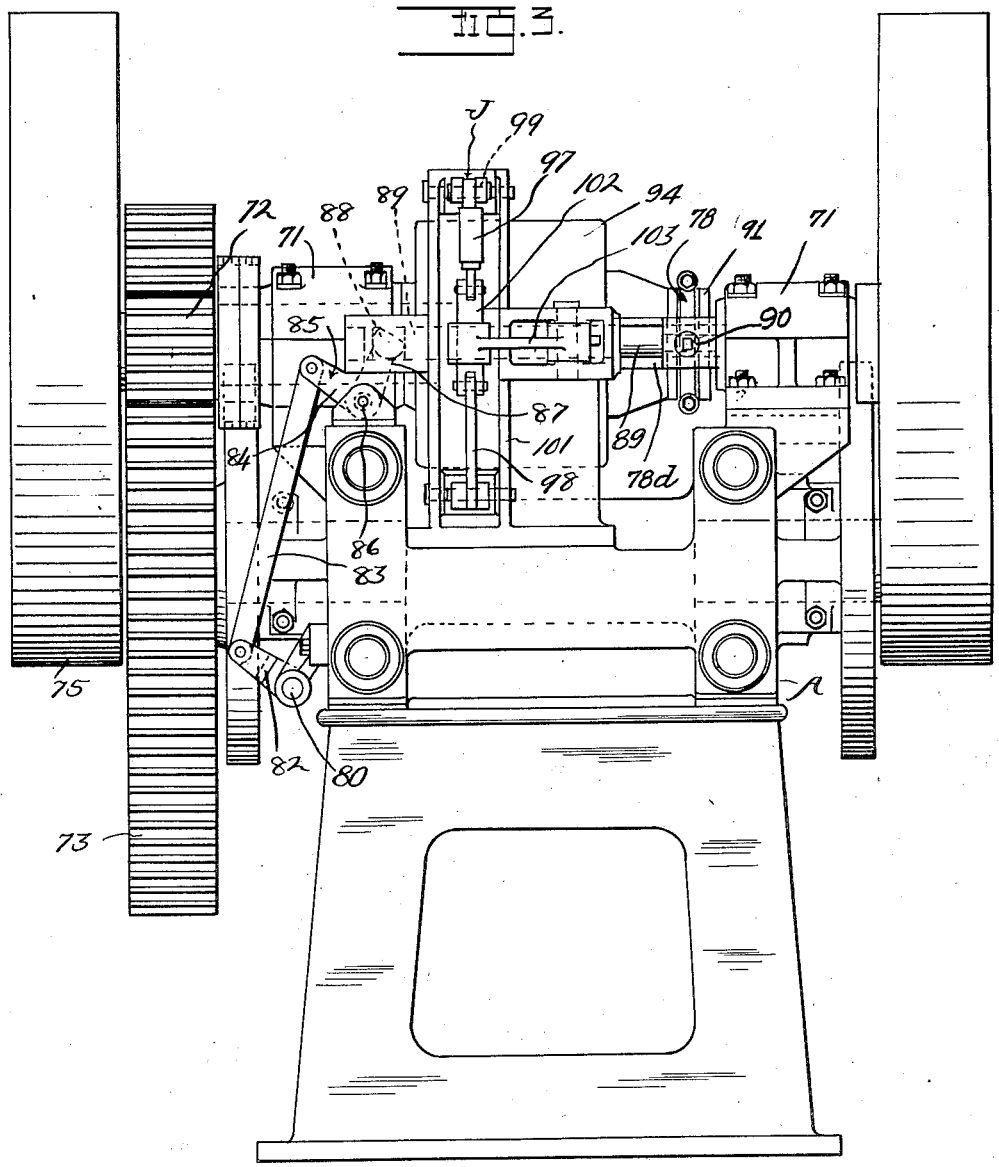

Sept. 29, 1936.   G. F. YAGER   2,055,887
CLUTCH AND BRAKE MECHANISM
Original Filed Dec. 15, 1930   4 Sheets-Sheet 4
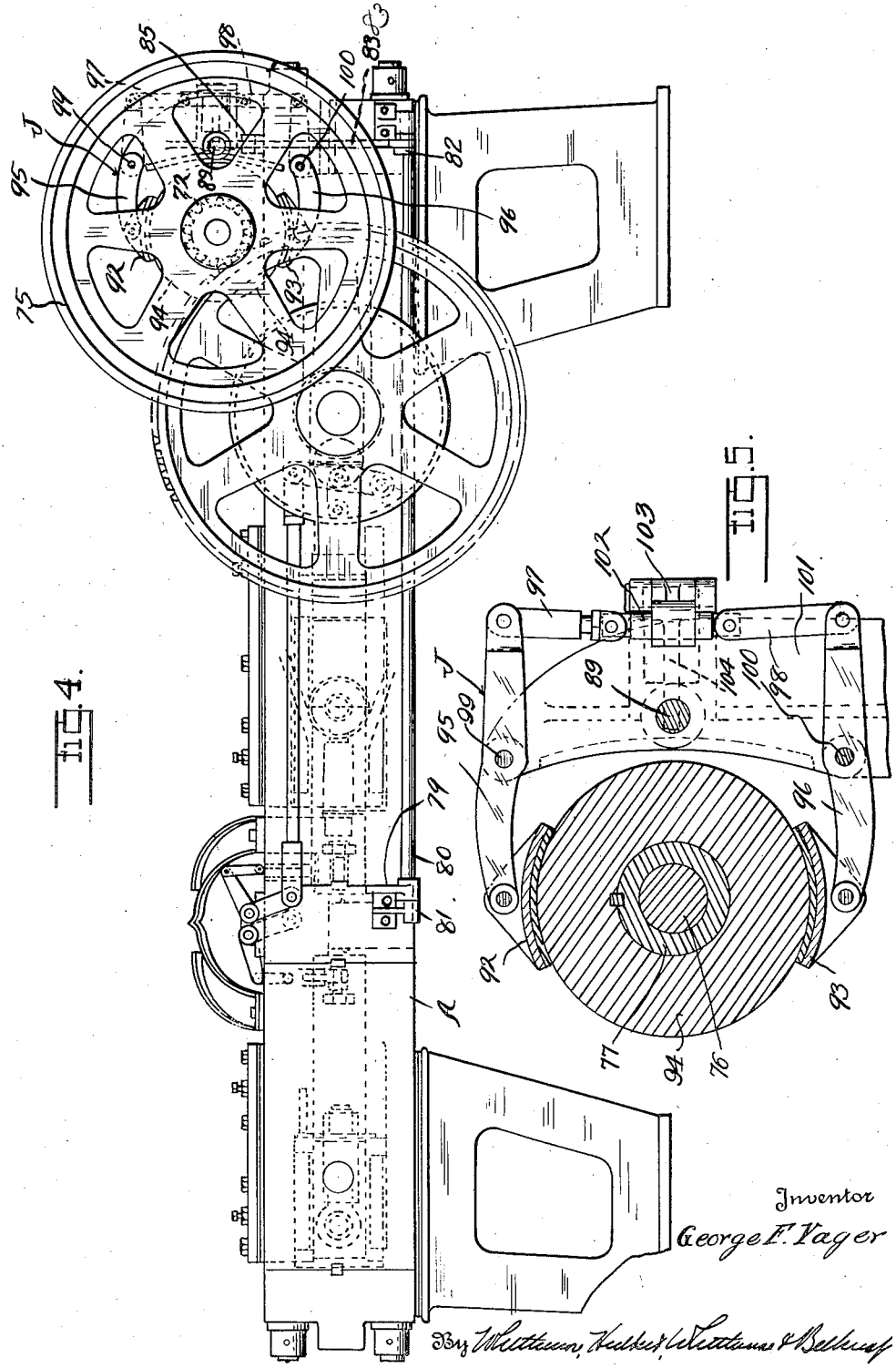

Patented Sept. 29, 1936

2,055,887

UNITED STATES PATENT OFFICE 2,055,887

CLUTCH AND BRAKE MECHANISM

George F. Yager, Toledo, Ohio, assignor to The Bunting Brass & Bronze Company, Toledo, Ohio, a corporation of Ohio Original application December 15, 1930, Serial No. 502,526, Patent No. 1,962,674. Divided and this application July 3, 1933, Serial No. 678,978

7 Claims. (Cl. 192—17).

This invention relates generally to an improved clutch and brake mechanism and constitutes a division of my application, Serial No. 502,526 filed December 15, 1930, which has become Patent No. 1,962,674.

One of the principal objects of the present invention consists in the provision of a clutch for operatively connecting a drive shaft to a driven shaft and also in the novel means for actuating the clutch.

Another advantageous feature of the present invention resides in the provision of means responsive to the operation of the clutch actuating means to disengage the clutch and substantially instantaneously arrest movement of the driven shaft.

The foregoing, as well as other objects, will be made more apparent as this description proceeds, especially when considered in connection with the accompanying drawings, wherein:

Figure 1 is a top plan view of a machine embodying a clutch and brake mechanism constructed in accordance with this invention;

Figure 2 is an enlarged fragmentary plan view having certain parts broken away to show the clutch mechanism in detail;

Figure 3 is a rear elevational view of the machine shown in Figure 1;

Figure 4 is a side elevational view of the machine shown in Figure 1;

Figure 5 is a sectional view taken substantially on the plane indicated by the line 5—5 of Figure 2; and Figure 6 is a fragmentary sectional view of the clutch mechanism showing the same in its inoperative position.

Referring now more in detail to the drawings, it will be noted that there is illustrated in Figure 2, a drive shaft 76 having one end portion journalled in a bearing 71 fixed in any suitable manner to the machine frame A and having the opposite end portion journalled in the inner end of a driven shaft 77, also supported on the machine frame A by a bearing 71'. The driven shaft is operatively connected to a power take-off gear 73 by means of a pinion 72 fixed on the driven shaft 77 in mesh with the power take-off gear. In addition, a suitable inertia wheel 75 is secured to the extreme outer end of the driven shaft and this inertia wheel cooperates with a corresponding wheel 75' fixed to the end of the drive shaft 76 beyond the bearing 71' to balance the two shafts when coupled together.

In the present instance, the drive shaft 76 is adapted to be operatively connected to the driven shaft by a suitable clutch 78 adapted to be manually controlled from a point intermediate the ends of the machine by an operating lever 79 shown in Figure 4 of the drawings. The clutch 78 selected herein for the purpose of illustration is of the Twyncone type having two cooperating cones 78ª and 78'. The cone 78ª is splined upon a sleeve 78ᵇ fixed to the drive shaft 76 for sliding movement in the direction of the axis of the drive shaft and the cooperating opposed cone 78' is fixed upon the sleeve 78ᵇ. Interposed between the conical surfaces of the two cones is a ring 78'' having the opposite sides adjacent the cones inclined at an angle corresponding to the inclination of the cone surfaces for engagement thereby and having the peripheral portion thereof splined on the inner surface of an axially extending flange 94' of the drum 94 for sliding movement axially of the drive shaft 76. The drum 94 is keyed to the inner end of the driven shaft 77 for rotation therewith as a unit and since the ring 78'' is splined to the drum, it necessarily follows that the ring will also rotate as a unit with the driven shaft. With the construction thus far described, it will be noted that sliding movement of the cone 78 in a direction toward the cooperating cone 78' causes the conical surface of the cone 78ª to frictionally engage the adjacent inclined surface of the link 78'' and effects movement of this ring axially of the drum 94 to engage the opposite inclined surface of the ring into frictional engagement with the conical surface of the cone 78'. Inasmuch as both cones are fixed to the drive shaft 76 for rotation therewith, and in view of the fact that the ring 78'' is secured to the driven shaft for rotation therewith, it necessarily follows that movement of the cone 78ª in the aforesaid direction operatively connects the driven shaft 77 to the drive shaft 76.

In accordance with the present invention, the cone 78ª is shifted axially of the drive shaft 76 to accomplish the above function by means of a sleeve 78ᵈ splined upon the drive shaft 76 and having the inner end operatively connected to the cone 78ª through the medium of linkage 78ᵉ. In the present instance, the cone 78ª is connected at diametrically opposite sides to the sleeve 78ᵈ through the medium of linkage 78ᵉ, but since both systems of linkage are identical in construction, only one will be described in detail herein. Upon reference to Figure 2, it will be noted that the linkage comprises a bell crank lever 78ʰ pivotally supported intermediate its ends from a stop 78ᵍ threadedly mounted on the inner end of the sleeve 78ᵇ. It may be stated at this point that the stop 78ᵍ functions to limit the extent of movement of the sleeve 78ᵈ from the inoperative position thereof shown in Figure 6 to the operative position of the same illustrated in Figure 2.

The inner end of the bell crank 78ʰ is connected to the cone 78ᵃ by means of a link 78ⁱ, while the outer end of the bell crank lever 78ʰ is pivotally connected to the inner end of the sleeve 78ᵈ by means of a link 78ʲ. Assuming that the driven shaft 77 is clutched to the drive shaft 76 or, in other words, assuming that the parts are in the positions thereof shown in Figure 2, it will be noted that movement of the sleeve 78ᵈ in an outward direction upon the shaft 76 effects a rocking movement of the bell crank 78ᵃ through the link 78ʲ in a clockwise direction and in so doing, causes the cone 78ᵃ to move in a direction away from the ring 78″. When the clutch 78 has been released in the above manner, the several parts of the mechanism assume the positions thereof shown in Figure 6 wherein it will be noted that inward movement of the sleeve 78ᵈ to the extent required to engage the inner end of the same with the stop 78ᵍ causes the bell crank 78ʰ to rock in the opposite direction about its pivotal support to the extent required to re-engage the clutch sections.

As previously stated, manipulation of the operating lever 79 controls the operation of the clutch 78 and in the present instance, this lever is connected to the sleeve 78ᵈ by means of a rock shaft 80 suitably journalled on the side of the machine frame. The connection between the rock shaft 80 and the sleeve 78ᵈ comprises a link 82 having one end fixed to the rock shaft and having the other end connected to the arm 84 of a bell crank lever 85 by means of a link 83. The extremity of the arm 87 of the bell crank lever 85 engages within a suitable slot 88 formed in a shaft 89 mounted for reciprocation on the machine frame. Secured to the shaft 89 is a shifter yoke 90 having the free end thereof engaging within an annular recess formed in the outer end of the sleeve 78ᵈ. Thus, it will be apparent that rocking movement of the shaft 80 in one direction by the operating lever 79 effects a movement of the clutch operating sleeve 78ᵈ inwardly to actuate the clutch and movement of the lever 79 in the opposite direction causes the sleeve 78ᵈ to release the clutch.

In order that the machine will come to an immediate rest upon the connection between the shaft sections 76 and 77 being broken by the clutch 78, I have provided a suitable brake mechanism designated generally by the reference character J. Preferably this mechanism comprises a pair of brake shoes 92 and 93 respectively engageable with diametrically opposite sides of the clutch drum or housing 94. Pivotally connected to the shoes 92 and 93 is a pair of levers 95 and 96 respectively having the free ends thereof pivotally connected to suitable toggle links 97 and 98 and fulcrumed intermediate the ends thereof upon pins 99 and 100 respectively carried by a suitable bracket 101 rigid with the machine frame. The free ends of the toggle links 97 and 98 are pivotally connected to an equalizing link 102 which in turn is connected to one arm of a bell crank lever 103 pivotally connected upon the link. The free arm 104 of the bell crank 103 engages within a suitable slot or opening 105 formed in the reciprocable shaft 89 and the construction is such that axial movement of the shaft to disconnect the clutch from the prime mover rocks the bell crank lever 103 in a direction to straighten the toggle links 97 and 98 and thereby rock the free ends of the actuating levers 95 and 96 downwardly causing the shoes 92 and 93 to grip the drum or housing 94 and thereby arrest the section 77 and stop the machine. When the clutch mechanism is manipulated to engage the clutch and establish a driving connection between the sections 76 and 77 the bell crank lever 103 is rotated in an opposite direction to rock the free ends of the levers 95 and 96 outwardly away from the drum 94 and thereby disengage the shoes 92 and 93 from the drum.

Thus from the foregoing it will be apparent that I have provided a brake mechanism for the machine which is automatically controlled and rendered effective or ineffective by the manipulation of the clutch 78.

While it is believed that from the foregoing description the nature and advantages of the invention will be readily apparent, I desire to have it understood that I do not limit myself to what is herein shown and described and that such changes may be resorted to when desired as fall within the scope of what is claimed.

What I claim as my invention is:

1. In a machine of the class described, a drive shaft, a driven shaft, a clutch for making and breaking a connection between said shafts, actuating means for the clutch including a movable part having slots therein at spaced points thereof, an operating lever, a connection between said lever and part including a member engaging one of said slots, a drum on the driven shaft, a brake shoe engaging with the drum, and actuating means for the shoe including a member engaging the other of said slots.

2. In a machine of the class described, a drive shaft, a driven shaft, a clutch for making and breaking a connection between said shafts, and actuating means for the clutch including a reciprocating shaft having a slot therein, a shifter yoke rigid with said reciprocating shaft and engaging said clutch, a pivotally mounted bell crank lever having an arm engaging the slot in said reciprocating shaft, a rockshaft, means for rocking said shaft, a lever carried by said rockshaft, and a link terminally connected to the last mentioned lever and to an arm of the bell crank lever.

3. In a machine of the class described, a drive shaft, a driven shaft, a clutch for making and breaking a connection between said shafts, actuating means for the clutch including a reciprocating shaft having spaced slots therein, a shifter yoke rigid with said reciprocating shaft and engaging said clutch, and a pivotally mounted lever engaging one of the slots in said reciprocating shaft, and means operable for arresting the movement of the driven shaft when the connection aforesaid is broken, including a brake drum upon the driven shaft, a brake shoe engageable with said drum, a lever connected to said shoe, a lever engaging the other slot in the reciprocating shaft, and linkage connecting the last two mentioned levers.

4. In a machine of the class described, a drive shaft, a driven shaft, a clutch for making and breaking a connection between said shafts, actuating means for the clutch including a reciprocating shaft having spaced slots therein, a shifter yoke rigid with said reciprocating shaft and engaging said clutch, and a pivotally mounted lever engaging one of the slots in said reciprocating shaft, and means operable for arresting the movement of the driven shaft when the connection aforesaid is broken, including a brake drum fixed upon the driven shaft, brake shoes engageable with said drum at substantially diametrically opposite points thereof, levers connected to said shoes, and equalizing link, links terminally connected to said last mentioned lever and equalizing link, and a bell crank lever having an arm connected to the equalizing link and having an arm engaging the other slot in the reciprocating shaft.

5. In a machine of the class described, a drive shaft, a driven shaft, a clutch for making and breaking a connection between said shafts, actuating means for the clutch including a reciprocating shaft, a shifter yoke rigid with said reciprocating shaft and engaging said clutch, and a pivotally mounted lever engaging said reciprocating shaft, and means operable automatically for arresting the movement of the driven shaft when the connection aforesaid is broken, including a brake drum upon the driven shaft, a brake shoe engageable with said drum, a lever connected to said shoe, a lever engaging the reciprocating shaft, and linkage connecting the last two mentioned levers.

6. In a machine of the class described, a drive shaft, a driven shaft, a clutch for making and breaking a connection between said shafts, actuating means for the clutch including a reciprocating shaft, a shifter yoke rigid with said reciprocating shaft and engaging said clutch, and a pivotally mounted lever engaging said reciprocating shaft, and means operable automatically for arresting the movement of the driven shaft when the connection aforesaid is broken, including a brake drum fixed upon the driven shaft, brake shoes engageable with said drum at substantially diametrically opposite points thereof, levers connected to said shoes, an equalizing link, links terminally connected to said last mentioned lever and equalizing link, and a bell crank lever having an arm connected to the equalizing link and having an arm engaging the reciprocating shaft.

7. In a machine of the class described, a drive shaft, a driven shaft, a clutch for making and breaking a connection between said shafts, actuating means for the clutch including a reciprocating part, an operating lever, a connection between said lever and part including a member engaging said reciprocating part, a drum on the driven shaft, a brake shoe engageable with said drum, and actuating means for the shoe including a member also engageable with said reciprocating part.

GEORGE F. YAGER.